United States Patent
Thin et al.

(10) Patent No.: US 11,852,755 B2
(45) Date of Patent: Dec. 26, 2023

(54) METHOD AND APPARATUS FOR PROVIDING A DIGITAL SENSOR SIGNAL FROM AN ULTRASONIC SENSOR

(71) Applicant: Valeo Schalter und Sensoren GmbH, Bietigheim-Bissingen (DE)

(72) Inventors: Charles Thin, Bietigheim-Bissingen (DE); Jean-Francois Bariant, Bietigheim-Bissingen (DE); Anto Michael, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 0 days.

(21) Appl. No.: 17/267,356

(22) PCT Filed: Jun. 6, 2019

(86) PCT No.: PCT/EP2019/064748
§ 371 (c)(1),
(2) Date: Feb. 9, 2021

(87) PCT Pub. No.: WO2020/030328
PCT Pub. Date: Feb. 13, 2020

(65) Prior Publication Data
US 2021/0231785 A1   Jul. 29, 2021

(30) Foreign Application Priority Data
Aug. 10, 2018  (DE) .................. 10 2018 119 533.8

(51) Int. Cl.
*G01S 7/533*     (2006.01)
*H04B 11/00*   (2006.01)
(Continued)

(52) U.S. Cl.
CPC ............. *G01S 7/533* (2013.01); *H04B 1/00* (2013.01); *G01S 15/931* (2013.01)

(58) Field of Classification Search
CPC ........................ G01S 15/931; H04B 11/00
See application file for complete search history.

(56) References Cited

U.S. PATENT DOCUMENTS

| 4,205,553 | A | * | 6/1980 | Rudis | ............ G01N 29/40 73/611 |
| 5,206,647 | A | * | 4/1993 | Stone | ............ H03M 1/183 341/139 |

(Continued)

FOREIGN PATENT DOCUMENTS

| DE | 102008057065 A1 | 5/2009 |
| DE | 102012222891 A1 | 6/2014 |

(Continued)

OTHER PUBLICATIONS

Distributed System Interface 3 Bus Standard Revision 1.00, DSI3 Consortium, Feb. 11, 2011 (Year: 2011).*

(Continued)

*Primary Examiner* — Isam A Alsomiri
*Assistant Examiner* — Joseph C Fritchman
(74) *Attorney, Agent, or Firm* — Osha Bergman Watanabe & Burton LLP

(57) ABSTRACT

A method for providing a digital sensor signal (DS) from an ultrasonic sensor (16) for signal transmission to a signal receiver (28) is disclosed, in which a digital output signal (OS) from the ultrasonic sensor (16) is processed to form the digital sensor signal for signal transmission. Provision is made for the processing to comprise the following steps: (i) determining a signal change (SC) of successive values of the output signal (OS), (ii) scaling this signal change (SC) by means of a variable scaling factor (SF) which is specified by a scaling scheme known to the ultrasonic sensor (16) and the (Continued)

Figure 1:
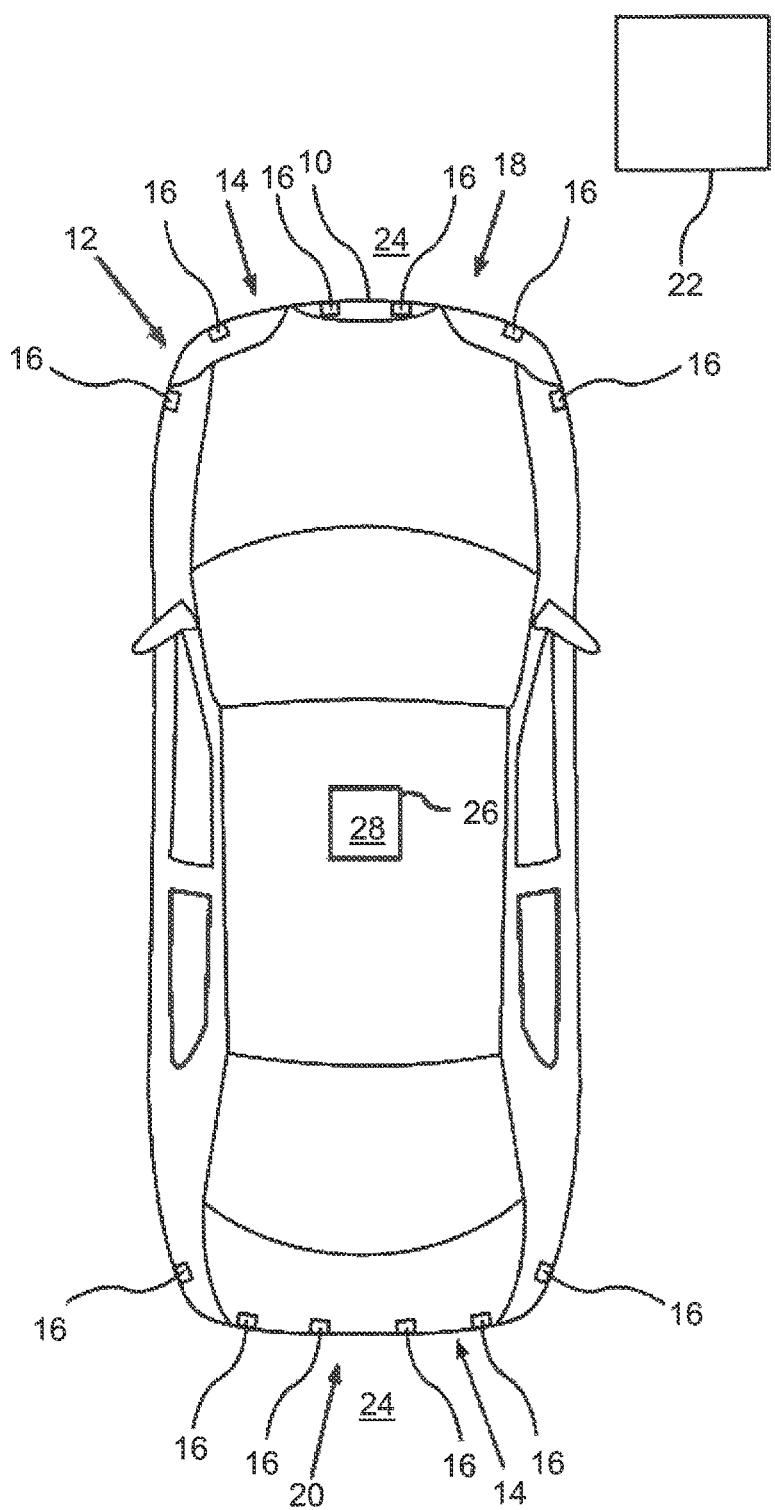

signal receiver (28), and (iii) outputting the scaled signal change (SC) as the digital sensor signal (DS). A corresponding apparatus (32) is disclosed for creating a digital sensor signal (DS) from an ultrasonic sensor (16) for signal transmission to a signal receiver (28), to a corresponding ultrasonic sensor device with an ultrasonic sensor (16) and such an apparatus (32), and to a corresponding ultrasonic sensor system (14).

13 Claims, 2 Drawing Sheets

(51) Int. Cl.
  *G01S 15/931* (2020.01)
  *H04B 1/00* (2006.01)

(56) References Cited

U.S. PATENT DOCUMENTS

| | | | |
|---|---|---|---|
| 2005/0219097 A1* | 10/2005 | Atriss | H03M 1/162 341/144 |
| 2008/0170606 A1* | 7/2008 | Rodal | H03G 3/3052 375/216 |
| 2011/0093739 A1 | 4/2011 | Bernon-Enjalbert et al. | |
| 2011/0121858 A1 | 5/2011 | Cassagnes et al. | |
| 2016/0109489 A1 | 4/2016 | Krishna et al. | |
| 2018/0037268 A1* | 2/2018 | Moore | G01S 7/4813 |

FOREIGN PATENT DOCUMENTS

| | | |
|---|---|---|
| DE | 102008044058 B4 | 10/2014 |
| DE | 102013226376 A1 | 6/2015 |
| DE | 102014220687 A1 | 4/2016 |
| DE | 102015120130 A1 * | 5/2017 |
| DE | 102017108348 B3 * | 6/2018 |
| DE | 102017108348 B3 | 6/2018 |
| DE | 102017103117 A1 | 8/2018 |
| DE | 102017118565 A1 | 2/2019 |
| DE | 102017118567 A1 | 2/2019 |
| DE | 102017118574 A1 | 2/2019 |
| DE | 102017125136 A1 | 5/2019 |
| EP | 1631091 A1 | 3/2006 |
| EP | 2263102 B1 | 8/2013 |
| EP | 3171553 A1 | 5/2017 |
| JE | 2008-211644 A | 9/2008 |
| KR | 2018-0028330 A | 3/2018 |
| KR | 2018-0063739 A | 6/2018 |

OTHER PUBLICATIONS

Tisserand E. and Berviller Y. (2016), Design and implementation of a new digital automatic gain control, Electronics Letters, 52(22) (Year: 2016).*
International Search Report and Written Opinion issued in corresponding International Patent Application No. PCT/EP2019/064748, dated Oct. 2, 2019 (14 pages).
German Search Report issued in corresponding German Application No. 10 2018 119 533.8, dated Feb. 13, 2019 (6 pages).
Notice of Reason for Rejection issued in Japanese Patent Application No. 2021-507015, dated Feb. 22, 2022 (11 pages).
Notice of Preliminary Rejection in corresponding Korean Application No. 2021-7007112, dated Sep. 8, 2022 (12 pages).

* cited by examiner

METHOD AND APPARATUS FOR PROVIDING A DIGITAL SENSOR SIGNAL FROM AN ULTRASONIC SENSOR

The present invention relates to a method for providing a digital sensor signal from an ultrasonic sensor for signal transmission to a signal receiver, in which a—preferably digital—output signal from the ultrasonic sensor is processed to form the digital sensor signal for signal transmission.

The invention also relates to a corresponding apparatus for providing a digital sensor signal from an ultrasonic sensor for signal transmission to a signal receiver, to a corresponding ultrasonic sensor device with an ultrasonic sensor and such an apparatus, and to a corresponding ultrasonic sensor system.

The document DE 10 2008 044 058 B4 describes a method and a system for providing a digital sensor signal from an ultrasonic sensor for signal transmission via LIN communication (LIN: Local Interconnect Network) to a control unit of this sensor. In this case, the system processes an output signal from the sensor to form the digital sensor signal for signal transmission via LIN communication.

The term signal transmission generally stands for information and data transmission. The transmission of data between an ultrasonic sensor and the control unit responsible for this sensor (English: ECU: electronic control unit) in motor vehicles is currently carried out using standardized transmission protocols, for example the bus protocol for LIN.

The transmission systems used for this are limited in terms of their data rate. Whereas the ultrasonic sensor itself has detailed information about the membrane vibrations upon receiving the ultrasonic signal as a measurement signal with the aid of an analog-to-digital converter with a high sampling rate and high quantization, in today's systems only highly lossy images of the actual measurement data are available in the control unit.

The data rate of the transmission between the ultrasonic sensor and the control unit always results from the sampling rate used and the quantization. If sampling rates of the measurement signal, referred to below as the output signal from the ultrasonic sensor or the raw signal, are too low (where a reduction in the sampling rate also results in a reduction in the necessary data rate), errors such as aliasing or a greatly reduced resolution arise due to the loss of information. Conventional quantization with a low number of bits, usually less than 5, generates high quantization noise, which in the worst case can prevent the data from being used meaningfully. An improvement in the quantization noise can be achieved under certain circumstances by means of non-linear characteristics. However, this approach is also severely restricted by the number of possible quantization states that result from the quantization bits.

On the basis of the above-mentioned prior art, the invention is therefore based on the object of specifying measures which enable the sensor signal to be transmitted as precisely as possible even with a limited transmission bandwidth.

The object is achieved according to the invention by the features of the independent claims. Advantageous refinements of the invention are specified in the dependent claims.

In the method according to the invention for providing a digital sensor signal from an ultrasonic sensor for signal transmission to a signal receiver, in which a—preferably digital—output signal from the ultrasonic sensor is processed to form the digital sensor signal for signal transmission, provision is made for the processing to comprise the following steps:

(i) determining a signal change of successive values of the output signal, (ii) scaling this signal change by means of a variable scaling factor which is specified by a scaling scheme known to the ultrasonic sensor and the signal receiver, and (iii) outputting the scaled signal change as the digital sensor signal. In other words, instead of (re-)scaling the values of the output signal, that is to say the signal amplitude, a signal change of successive values of the output signal is determined and scaled.

If there is a sufficiently high bandwidth available for signal transmission and the dynamic range of the resulting signal change is known in advance, the scaling needs to be defined only once. However, such a situation generally does not exist.

According to one preferred embodiment of the invention, the signal transmission to the signal receiver has a predefined bandwidth (number of bits), the scaling scheme adapt-ing the size of the scaling factor to this predefined bandwidth. The need for repeated (re-)scaling is usually necessary since the bandwidth during transmission is clearly too small for the dynamics of the signal change. As mentioned at the outset, the number of bits is usually less than 5. With a number of bits of 3, only a resolution of ⅛ of the bandwidth can be achieved. The fact that the signal change to be transmitted here has relatively high dynamics must be taken into account by changing the scaling factor, i.e. rescaling.

So that the scaling factor does not also have to be additionally concomitantly transmitted to the signal receiver during signal transmission, the variable scaling factor is defined according to a scaling scheme that is equally known to both the ultrasonic sensor and the signal receiver.

The scaling factor is adapted, in particular, in such a way that the signal change can probably be correctly transmitted with the predefined bandwidth. Two factors are of particular interest here: (i) The criterion of when an adaptation is deemed necessary and (ii) the "step size" of the adaptation.

A further preferred embodiment of the invention provides for the size of the scaling factor for two successive values in a continuous sequence of values to be adapted to the predefined bandwidth according to the scaling scheme if the scaled signal change of the last two previously considered values in the continuous sequence uses a portion of the bandwidth that is in at least a predefined range. Two such ranges are usually provided. If the scaled signal change is in the first range, then it is scaled up, that is to say a higher scaling factor than before is used; if the scaled signal change is in the second range, then it is scaled down, that is to say a lower scaling factor than before is used. The first range is a range from 0 to x times the bandwidth and the second range is a range from y to 1 times the bandwidth, where $0.1 < x < 0.33$ and $0.66 < y < 0.9$. For example, provision is made for scaling up to be carried out by increasing the scaling factor if less than 20% ($x=0.2$) of the bandwidth is used and for scaling down to be carried out by reducing the scaling factor if more than 80%$_6$ ($y=0.8$) of the bandwidth is used.

The adaptation of the scaling factor according to the scaling scheme is now dependent only on the last scaled signal change SC, that is to say the last signal change determined and then scaled according to the scheme. Since both the apparatus for creating a digital sensor signal and the signal receiver know the scaling scheme, no further information is required for both of them—besides the scheme itself—in order to code/decode the signal.

The scaling scheme is therefore a scaling scheme in which the scaling factor results solely from the last previously processed scaled signal change value.

In particular, provision is made for the size of the scaling factor to be increased or decreased by at least a factor of two during the adaptation. The size of the scaling factor is preferably increased or decreased in the range of an entire order of magnitude, that is to say in the range of a factor of 10, during the adaptation. In other words, the adaptation is highly dynamic, with the result that the output signal from the ultrasonic sensor can be transmitted correctly even with a very low bandwidth.

A further preferred embodiment of the invention provides for the signal change of the output signal to be determined by means of a subtraction. Such a subtraction can be carried out in a simple manner by means of a subtractor module.

Yet another preferred embodiment of the invention provides for the signal transmission to be a data transmission via a BUS system, in particular a LIN bus system. The Local Interconnect Network (LIN), also known as LIN bus, is a serial communication system for networking sensors and actuators, i.e. a field bus. The LIN bus is used, in particular, where the bandwidth and versatility of a CAN bus system (CAN: Controller Area Network) is not required. Typical application examples are networking within a motor vehicle sector.

The data transmission is advantageously a data transmission according to the DSI3 bus protocol. The Distributed Systems Interface (DSI) is a bus protocol which is used to connect a plurality of distributed systems, sensors and actuators to a central control unit. It is one, if not the, predestined protocol for this application.

In the apparatus according to the invention for providing a digital sensor signal from an ultrasonic sensor for signal transmission to a signal receiver, which apparatus is configured to process a—preferably digital—output signal from the ultrasonic sensor to form the digital sensor signal for signal transmission, provision is made for the apparatus to be configured: (i) to determine a signal change of successive values of the output signal, (ii) to scale this signal change by means of a variable scaling factor which is specified by a scaling scheme known to the ultrasonic sensor and the signal receiver, and (iii) to output the scaled signal change as the digital sensor signal.

The embodiments of the invention mentioned above in the context of the description of the method also apply accordingly to the apparatus.

One preferred embodiment of the apparatus according to the invention provides for the apparatus to be configured to carry out the above-mentioned method.

In the case of the ultrasonic sensor device according to the invention with an ultrasonic sensor, provision is made for said device to also have an aforementioned apparatus for creating a digital sensor signal from the ultrasonic sensor, which is connected downstream of the ultrasonic sensor in terms of signalling.

In the ultrasonic sensor system according to the invention for a motor vehicle, with at least one ultrasonic sensor and a signal receiver, in particular a control unit, provision is made for this ultrasonic sensor system to also have at least one aforementioned apparatus for creating a digital sensor signal from the ultrasonic sensor.

The invention is explained in more detail below with reference to the attached drawings using preferred embodiments.

IN THE DRAWINGS

Figure 2:
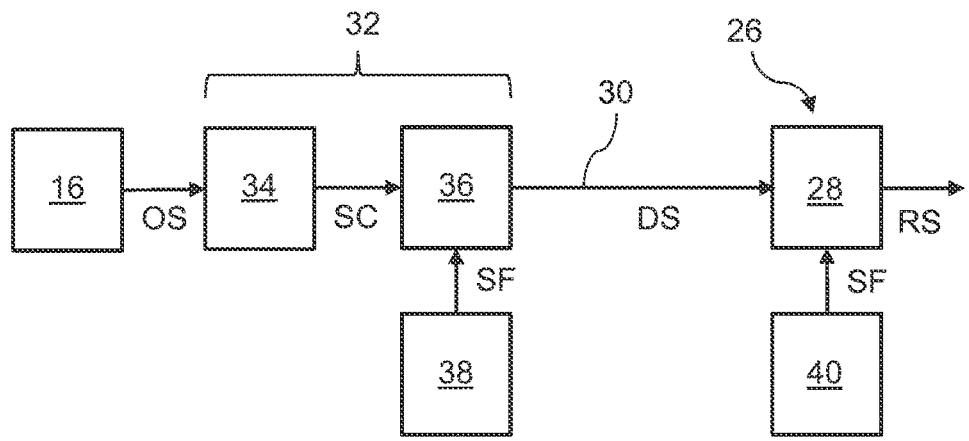
Figure 3:
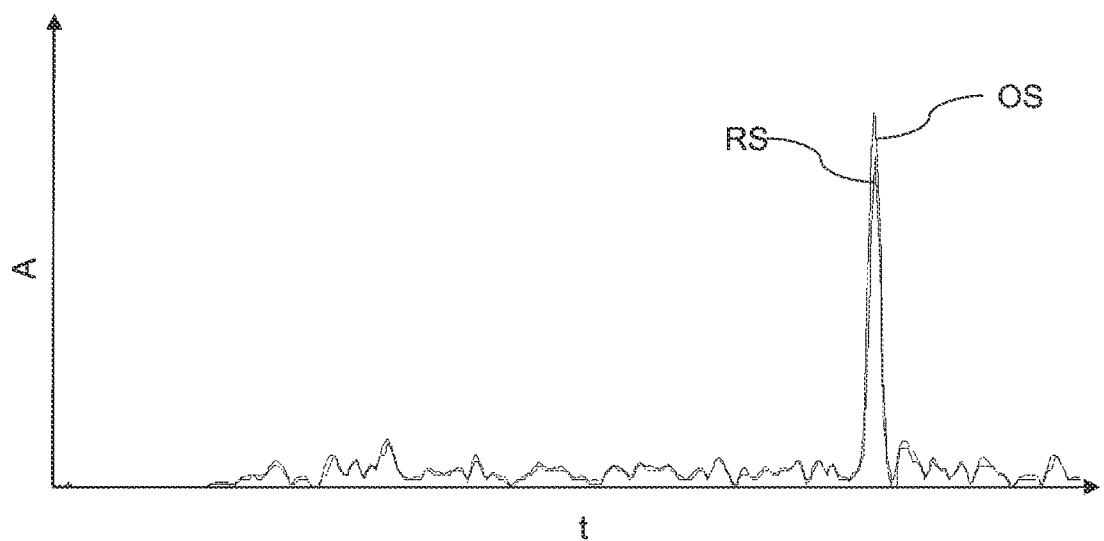

FIG. 1 shows a motor vehicle which has a driver assistance system having an ultrasonic sensor apparatus according to one embodiment of the invention, FIG. 2 shows an equivalent circuit diagram of an apparatus for creating a digital sensor signal from an ultrasonic sensor according to one embodiment of the invention, and FIG. 3 shows a comparison of an original sensor output signal and a signal reconstructed after transmission in a time-dependent representation.

FIG. 1 shows a plan view of a motor vehicle 10 embodied here as a passenger vehicle. The motor vehicle 10 comprises a driver assistance system 12 which serves to assist a driver when driving the motor vehicle 10. In particular, the driver assistance system 12 can be embodied as a parking assistance system, by means of which the driver can be assisted when parking the motor vehicle 10 in a parking space and/or when exiting the parking space.

The driver assistance system 12 in turn comprises an ultrasonic sensor system 14. The ultrasonic sensor system 14 has at least one ultrasonic sensor 16. In the present exemplary embodiment, the ultrasonic sensor apparatus 14 comprises twelve ultrasonic sensors 16. In this context, six ultrasonic sensors 16 are arranged in a front region 18 of the motor vehicle 10, and six ultrasonic sensors 16 are arranged in a rear region 20 of the motor vehicle 10. The ultrasonic sensors 16 can be mounted, in particular, on the bumpers of the motor vehicle 10. In this context, the ultrasonic sensors 16 can be arranged at least in certain areas in corresponding recesses or through-openings in the bumpers. There can also be provision for the ultrasonic sensors 16 to be arranged in a manner concealed behind the bumpers. Basically, the ultrasonic sensors 16 can also be arranged on further panelling components of the motor vehicle 10. For example, the ultrasonic sensors 10 can be arranged on or concealed behind the doors of the motor vehicle 10.

Sensor signals which describe at least one object 22 in an area 24 surrounding the motor vehicle 10 can be made available using the respective ultrasonic sensors 16. An object 22 is shown schematically in the surrounding area 24 here. In order to determine the sensor signal, an ultrasonic signal can be emitted with each of the ultrasonic sensors 16. After this, the ultrasonic signal reflected by the object 22 can be received again. A dis-tance between the ultrasonic sensor 16 and the object 22 can then be determined on the basis of the transit time between the emission of the ultrasonic signal and the recep-tion of the ultrasonic signal reflected by the object 22. There can also also be provision for the respective distances which are determined with different ultrasonic sensors 16 to be taken into account. The relative position between the motor vehicle 10 and the object 22 can therefore be determined by means of trilateration. There can also be provision for the ultrasonic signal that was emitted by one of the ultrasonic sensors 16 to be received by another of the ultrasonic sensors 16. This is also referred to as cross measurement.

Furthermore, the ultrasonic sensor system 14 comprises an electronic control unit 26 as a signal receiver 28, which control unit is connected to the ultrasonic sensors 16 for data transmission via a data line 30 or a bus system (the line 30 is shown in FIG. 2). The sensor signals determined with the respective ultrasonic sensors 16 can be transmitted via the data line 30 to the control unit 26 as a signal receiver 28. On the basis of the sensor signals, the control unit 26 can check whether the object 22 is located in the surrounding area 24, and at which position the object 22 is located in the surrounding area 24. This information can then be used by the driver assistance system 12 in order to output an output to the driver of the motor vehicle 10. In addition, there can be provision for the driver assistance system 12 to intervene in a steering system, a brake system and/or a drive engine in order to manoeuvre the motor vehicle 10 autonomously or at least semi-autonomously as a function of the at least one sensed object 22.

FIG. 2 shows an apparatus 32 for providing a digital sensor signal DS from an ultrasonic sensor 16 from the original measurement signal from the sensor 16, referred to below as the output signal (or raw signal) OS. The digital sensor signal DS is then transmitted, for example, via a LIN bus (LIN: Local Interconnect Network) data line 30 to the control unit 26 as a signal receiver 28. For this purpose, the apparatus 32 processes the output signal OS from the ultrasonic sensor 16 to form a digital sensor signal DS for a signal transmission with a limited transmission rate. In this case, a signal change SC of successive values (or amplitudes) of the output signal OS is determined by means of a subtractor 34 and a holding element (not shown here) which holds the previous value of the output signal OS, with the result that the subtractor 34 is used to determine the difference between the previous value and the current value of the output signal OS, that is to say the signal change SC of the output signal OS. This signal change SC is then scaled accordingly by means of a scaler 36 and made available for transmission as the digital sensor signal DS. The scaler 36 is a type of quantizer in which the quantization step size is scalable/adjustable.

Scaling amplitude values of the signal OS (instead of the scaling of the signal changes SC carried out here) has the disadvantage, particularly in the case of ultrasonic echoes, that high amplitude excursions are generated when the membranes vibrate during transmission, while the output signals RS of ambient echoes are usually significantly lower.

The signal change SC is scaled via a variable scaling factor SF which is specified by a scaling scheme known to the ultrasonic sensor 16 and the signal receiver 28. This scaling scheme is stored as a scaling adaptation protocol both in a data memory 38 of the apparatus 32 for creating the digital sensor signal DS and in a data memory 40 of the control unit 26.

According to the scaling scheme, the size of the scaling factor SF for two successive values in a continuous sequence of values is adapted to the predefined bandwidth if the scaled signal change of the last two previously considered values in the continuous sequence uses a portion of the bandwidth that is in at least one predefined range at the top end or bottom end of the bandwidth. If only a small portion of the bandwidth is currently being used, for example below 20%, scaling up is carried out; if a large portion of the bandwidth is currently being used, for example over 80%, scaling down is carried out.

FIG. 3 shows a comparison of the original sensor output signal OS and a signal RS reconstructed from the transmitted digital sensor signal DS in a time-dependent representation. In other words, the original sensor output signal OS and a signal RS reconstructed from the transmitted digital sensor signal DS are each shown here as a graph, the respective signal amplitude A being plotted over time t. The reconstructed signal RS shown here results from a digital sensor signal DS which was transmitted via DSI bus operation, the sampling frequency first being divided by two, then coded and decoded with DSI3 according to the method described.

This comparison shows how well the signal RS reconstructed in this way follows the original sensor output signal OS, even with only 3 bits.

The properties and the advantageous effects of the procedure described here shall be briefly outlined again below in other words:

The sensor electronics sample the vibration amplitude at a specific frequency (graph OS in FIG. 3). Instead of the samples of the vibration amplitude, the differences between two successive samples of the vibration amplitude, that is to say the signal change SC (as a digital sensor signal DS), are transmitted.

Every difference value, i.e. every signal change SC, is coded to a fixed number of bits (in the example: 3 bits).

The scaling of the difference values (signal change SC) to the 3 bits is flexible, however, and follows a protocol known by each side (the ultrasonic sensor device 16, 32 as the transmitter and the control unit 26 as the receiver), the scaling scheme.

The adaptation according to the scaling adaptation protocol or scaling scheme is only dependent on the last transmitted 3-bit scaled signal change SC. Since the scaling adaptation protocol or scaling scheme is also known to the receiver, it is not necessary to transmit any further information.

The scaling adaptation protocol takes, as the input, the last 3-bit difference value and the last so-called scaling factor SF ("scaling level", which is simply referred to as n below, in which case the scaling adaptation protocol or scaling scheme is stored locally in the transmitter and the receiver) and gives, as the output, a new, adapted scaling factor SF. With said 3 bits, the following result, for example:

Values 0 and 7 (strongest increase/strongest decrease): n=n+step_up (e.g. step_up=4);

Values 3, 4 and 5 (little to no increase/little to no decrease): n=n−step_down (e.g. step_down=2);

n is limited between 1 and max_scaling_level (e.g. max_scaling_level=12);

Each scaling level includes an amplitude value, referred to here as f(n) (where n is the scaling factor).

A linear conversion of the difference value to 3 bits is used, with a main factor f(n), for example:

Value 3 to 3 bits (011) gives a difference value between −f(n)/2 and +f(n)/2 (i.e. more or less no difference at all);

Value 7 gives a difference value of greater than 4*f(n)−f(n)/2 (largest difference that can be represented, value to 3 bits reaches saturation);

Value 0 gives a difference value of less than −3*f(n)+f(n)/2 (smallest difference that can be represented, value to 3 bits reaches saturation); and so on.

Example for f: f(n)=scaling_factor*n3/2 (e.g. scaling_factor=4).

The values f(n) for all n between 1 and max_scaling_level are calculated in advance (e.g. during initialization) in order to save runtime during coding/decoding. This example variant for f also allows a quick increase in scaling if n increases.

During coding, the value that would be decoded by the receiver 28 is calculated in a parallel manner, and the difference is thus calculated with the next sample. This improves the general accuracy of the whole coding/decoding process and allows for possible slow drifting during decoding.

It is assumed during decoding that the first value is 0. In most cases, this assumption is appropriate in reality. This means that no start value has to be sent at the beginning either. The first transmitted value of the transmitted digital signal DS can already be a first difference value, namely the difference value between 0 and the second sample of the amplitude.

LIST OF REFERENCE SIGNS

Motor vehicle 10
Driver assistance system 12
Ultrasonic sensor system 14
Ultrasonic sensor 16
Front region 18
Rear region 20
Object 22
Surrounding area 24
Control unit 26
Signal receiver 28
Data line 30
Apparatus for creating a digital sensor signal 32
Subtractor 34
Scaler 36
Data memory 38
Data memory 40
Amplitude A
Digital sensor signal for transmission DS
Output signal from the sensor OS
Reconstructed signal at the signal receiver RS
Signal change (output signal) SC
Scaling factor SF
Time t

The invention claimed is:

1. A method for providing a digital sensor signal from an ultrasonic sensor for signal transmission to a signal receiver, in which a digital output signal from the ultrasonic sensor is processed to form the digital sensor signal for signal transmission, the method comprising:
 determining a signal change of successive amplitude values of the output signal;
 scaling the signal change by a variable scaling factor which is specified by a scaling scheme known to the ultrasonic sensor and the signal receiver; and
 outputting the scaled signal change as the digital sensor signal,
 wherein the variable scaling factor is determined only by a value of a single previous sample of a processed scaled signal change, a single previous variable scaling factor, and the scaling scheme.

2. The method according to claim 1, wherein the signal transmission to the signal receiver has a predefined bandwidth and the size of the variable scaling factor is adapted to this predefined bandwidth by means of the scaling scheme.

3. The method according to claim 2, wherein the size of the variable scaling factor for two successive values in a continuous sequence of values of the output signal is adapted to the predefined bandwidth according to the scaling scheme based on the scaled signal change of the last two previously considered values in the continuous sequence using a portion of the bandwidth that is in at least a predefined range.

4. The method according to claim 2, wherein the scaling scheme increases the variable scaling factor based on the scaled signal change of two most recent successive values in the continuous sequence using a portion of the predefined bandwidth in a range below a first predefined threshold value of the predefined bandwidth.

5. The method according to claim 2, wherein the scaling scheme reduces the scaling factor based on the scaled signal change of two most recent successive values in the continuous sequence using a portion of the predefined bandwidth in a range above a second predefined threshold value of the predefined bandwidth.

6. The method according to claim 1, wherein the size of the variable scaling factor is increased or decreased by at least a factor of two during an adaptation.

7. The method according to claim 1, wherein the signal change of the output signal is determined by means of a subtraction.

8. The method according to claim 1, wherein the signal transmission is a data transmission via a BUS system, in particular a LIN bus system.

9. The method according to claim 8, wherein the data transmission is a data transmission according to the DSI3 bus protocol.

10. The method according to claim 1, wherein the scaling scheme is stored locally in an ultrasonic sensor device and a control unit to code/decode the signal without further information required.

11. An apparatus for providing a digital sensor signal from an ultrasonic sensor for signal transmission to a signal receiver, the apparatus being configured to:
 process a digital output signal from the ultrasonic sensor to form the digital sensor signal for signal transmission,
 determine a signal change of successive amplitude values of the output signal, to scale the signal change by a variable scaling factor which is specified by a scaling scheme known to the ultrasonic sensor and the signal receiver, and
 output the scaled signal change as the digital sensor signal,
 wherein the variable scaling factor is determined only by a value of a single previous sample of a processed scaled signal change, a single previously variable scaling factor, and the scaling scheme.

12. An ultrasonic sensor device comprising: an ultrasonic sensor; and an apparatus according to claim 11 connected downstream of the ultrasonic sensor in terms of signaling.

13. An ultrasonic sensor system for a motor vehicle, comprising: at least one ultrasonic sensor; a signal receiver as part of a control unit; and at least one apparatus according to claim 11.

* * * * *